United States Patent
Gilbertson et al.

(10) Patent No.: US 10,683,125 B2
(45) Date of Patent: Jun. 16, 2020

(54) PLASTIC FASTENER DISPENSING HAND TOOL HAVING A NOVEL ANVIL DESIGN TO REDUCE NEEDLE STICKS

(71) Applicant: Avery Dennison Corporation, Glendale, CA (US)

(72) Inventors: Daniel M. Gilbertson, Millbury, MA (US); David E. Herring, Shrewsbury, MA (US); Jeffrey A. Raymond, Leominster, MA (US); John Albert, Whitmore Lake, MI (US)

(73) Assignee: Avery Dennison Corporation, Glendale, CA (US)

( * ) Notice: Subject to any disclaimer, the term of this patent is extended or adjusted under 35 U.S.C. 154(b) by 369 days.

(21) Appl. No.: 15/620,039

(22) Filed: Jun. 12, 2017

(65) Prior Publication Data

US 2017/0275040 A1    Sep. 28, 2017

Related U.S. Application Data

(62) Division of application No. 14/450,688, filed on Aug. 4, 2014, now Pat. No. 9,708,091.

(60) Provisional application No. 61/303,352, filed on Feb. 11, 2010, provisional application No. 61/373,517, filed on Aug. 13, 2010, provisional application No. 61/406,602, filed on Oct. 26, 2010.

(51) Int. Cl.
*B65C 7/00* (2006.01)
*B23P 6/00* (2006.01)

(52) U.S. Cl.
CPC ................ *B65C 7/005* (2013.01); *B23P 6/00* (2013.01); *B65C 7/00* (2013.01); *B65C 2201/00* (2013.01); *Y10T 29/4973* (2015.01); *Y10T 29/49716* (2015.01); *Y10T 29/49718* (2015.01); *Y10T 29/49833* (2015.01)

(58) Field of Classification Search
CPC ........ B65C 7/00; B65C 7/005; B65C 2201/00
USPC .......................................................... 227/67
See application file for complete search history.

(56) References Cited

U.S. PATENT DOCUMENTS

| | | |
|---|---|---|
| 3,734,375 A | 5/1973 | Bone |
| 3,924,788 A | 12/1975 | Furutu |
| 4,610,384 A | 9/1986 | Duchin et al. |

(Continued)

FOREIGN PATENT DOCUMENTS

| | | |
|---|---|---|
| AU | 19700012430 | 9/1971 |
| CN | 1136332 | 11/1996 |

(Continued)

OTHER PUBLICATIONS

Japanese Patent Application No. 2012-552982 Office Action Notice of Reason(s) for Refusal dated Jul. 8, 2014.

(Continued)

*Primary Examiner* — Michelle Lopez

(57) ABSTRACT

An improved hand tool for dispensing plastic fasteners having a novel anvil design and a needle. The hand tool has a gun shaped casing with a barrel portion and a handle portion. The casing has a needle assembly opening at the front of the barrel portion and a trigger slot at the front of the handle portion. The hand tool further has a hollow needle disposed on one end of a needle assembly. The hand tool further has a trigger that is pivotally mounted within the casing that extends out from the trigger slot. The hand tool further has an anvil.

10 Claims, 8 Drawing Sheets

(56) References Cited

U.S. PATENT DOCUMENTS

| | | |
|---|---|---|
| 4,610,385 A | 9/1986 | Duchin |
| 4,673,120 A | 6/1987 | Strausburg |
| 4,681,248 A | 7/1987 | Duchin |
| 4,682,721 A | 7/1987 | Duchin |
| 5,024,365 A | 6/1991 | Bourque |
| 5,305,939 A | 4/1994 | Deschenes et al. |
| 5,307,975 A | 5/1994 | Deschenes et al. |
| 5,501,002 A | 3/1996 | Fukami |
| 5,639,006 A | 6/1997 | Kim |
| 5,683,025 A | 11/1997 | Grendol |
| 5,772,073 A | 6/1998 | Deschenes |
| 5,813,589 A | 9/1998 | Kim et al. |
| 5,950,901 A | 9/1999 | Kubota et al. |
| 6,267,285 B1 | 7/2001 | Raymond et al. |
| 6,533,155 B1 | 3/2003 | Kubota et al. |
| 6,752,307 B2 | 6/2004 | Raymond |
| 6,837,143 B2 | 1/2005 | Inoue |
| 6,837,413 B1 | 1/2005 | Raymond et al. |
| 6,929,166 B2 * | 8/2005 | Furutsu .................... B65C 7/00 227/67 |
| 7,331,497 B2 | 2/2008 | Cooper et al. |
| 2004/0359041 | 2/2004 | Kunreuther |
| 2011/0220701 A1 | 9/2011 | Gilbertson et al. |
| 2012/0217281 A1 | 1/2012 | Davis et al. |

FOREIGN PATENT DOCUMENTS

| | | |
|---|---|---|
| CN | 1556763 | 12/2004 |
| CN | 1617816 | 5/2005 |
| JP | 52003397 | 1/1977 |
| JP | 60134831 | 7/1985 |
| JP | 2005510418 | 4/2005 |
| WO | 200051792 | 9/2000 |
| WO | 2003045787 | 6/2003 |
| WO | 2005005265 | 1/2005 |

OTHER PUBLICATIONS

Japanese Patent Application No. 2012-552983 Office Action Notice of Reason(s) for Refusal dated Jul. 8,2014.

International Search Report and Written Opinion dated Jun. 16, 2011 for International Application No. PCT/US2011/024299.

International Search Report and Written Opinion dated Jun. 16, 2011 for International Application No. PCT/US2011/024302.

International Search Report and Written Opinion dated Jun. 16, 2011 for International Application No. PCT/US2011/024304.

The State Intellectual Property Office of P.R.C. Search Report dated Nov. 25, 2013 for Chinese Application No. 2011800185125.

References the State Intellectual Property Office of P.R.C. Search Report dated Nov. 25, 2013 for Chinese Application No. 2011800185021.

* cited by examiner

PLASTIC FASTENER DISPENSING HAND TOOL HAVING A NOVEL ANVIL DESIGN TO REDUCE NEEDLE STICKS

CROSS-REFERENCE TO RELATED APPLICATIONS

The present application is a division of U.S. application Ser. No. 14/450,688 now U.S. Pat. No. 9,708,091, which claims the benefit of U.S. Provisional Application Nos. 61/303,352 filed Feb. 11, 2010, 61/373,517 filed Aug. 13, 2010, and 61/406,602 filed Oct. 26, 2010, all of which are incorporated herein by reference in their entireties.

FIELD OF THE INVENTION

A hand tool for dispensing plastic fasteners and a method of using the same. More particularly, the invention relates to a hand tool for dispensing plastic fasteners for the purpose of attaching hangtags to various articles. The hand tool has a novel anvil design that reduces inadvertent user needle sticks during operation of the hand tool. Furthermore, the hand tool utilizes a needle having a novel needle casing that further reduces inadvertent user needle sticks during the replacement of the hand tool needle.

BACKGROUND OF THE INVENTION

The present invention relates to a hand tool for dispensing plastic fasteners, and more particularly to a novel plastic fastener dispensing hand tool that reduces inadvertent user needle sticks by employing a novel anvil design and a novel needle casing for needles utilized by the hand tool.

Plastic fasteners of the type comprising an elongated flexible filament having a first enlargement at one end of the flexible filament and a second enlargement at the opposite end are well-known in the art and widely used in commerce. One common application for this type of plastic fastener is to attach labels, price tags or other items to articles. Traditionally, a plastic fastener dispensing hand tool (commonly referred to as a "tagging gun") having an exposed stationary needle has been used to dispense plastic fasteners to attach labels, price tags, or other items to an article. Tagging guns having an exposed stationary needle are known, examples of such tools including those disclosed in U.S. Pat. Nos. 5,639,006, 5,683,025, and 5,772,073.

The design of these known tagging guns results in several operating issues. First, the basic design of exposed needle tagging guns lends to unnecessary risks that may result in operator injury. The exposed needle of the tagging gun presents the problem of inadvertently causing injury to a worker and also accidental needle breakage, as the pointed end of the needle is always exposed. While some sort of needle protection device is often provided to cover the exposed stationary needle when not in use, the needle protection device often becomes lost once the tagging gun is introduced into the workplace, and does nothing to protect against needle breakage.

Furthermore, the operation of known exposed needle tagging guns leads to a high risk of operator injury. The design of the above-identified tagging guns requires an operator to, first, insert the exposed stationary needle through a label or price tag, then, pierce the article the operator wishes to attach the label or price tag to with the exposed stationary needle, and finally, actuate the tagging gun to dispense a plastic fastener to attach the label or price tag to the article. During this process, the operator is exposed to two operations that may result in operator injury. First, the operator may inadvertently stick himself or herself with the needle as the operator attempts to insert the needle through the label or price tag. Second, the operator may inadvertently stick himself or herself with the needle as the operator pierces the article with the needle.

An additional operating issue associated with the design of the known tagging guns is that the above described process of attaching a label or price tag to an article requires a high level of dexterity. The operator is required to simultaneously manipulate both the label or price tag and the article to which the label or price tag is being attached while simultaneously manipulating and actuating the tagging gun. The likelihood of an operator sticking himself or herself with the exposed needle is greatly increased as an operator will take less care to avoid sticking himself or herself with the exposed needle when the operator is distracted and preoccupied with coordinating the many tasks necessary to operate the tagging gun.

Finally, the procedure for replacing the needle of known tagging gun designs further increases the possibility of operator injury. To replace the needle of known tagging guns, the operator is required to directly grasp the needle. Because the needle of the tagging gun is small, grasping the needle requires a high level of dexterity. An operator may find difficulty in grasping the needle, and there exists a high probability that an operator may accidentally stick himself or herself with the needle as the operator struggles to remove the needle from the tagging gun.

Therefore, what is needed is an improved tagging gun that reduces the risk of operator injury during the use of the tagging gun. Specifically, it is desired to provide a tagging gun that reduces that chance of operator injury during the attachment of labels or price tags to articles, and also during the replacement of the tagging gun needle.

BRIEF SUMMARY OF THE INVENTION

By providing an improved hand tool for dispensing plastic fasteners having a novel anvil design that is intended to reduce inadvertent user needle sticks during operation of the hand tool, and a needle having a novel casing that further reduces inadvertent user needle sticks during the replacement of the hand tool needle, the present invention overcomes above-described problems associated with current exposed stationary needle tagging gun designs.

The present invention relates to a hand tool for dispensing plastic fasteners. The hand tool has a gun shaped casing with a barrel portion and a handle portion. The casing has a needle assembly opening at the front of the barrel portion and a trigger slot at the front of the handle portion. The hand tool further has a hollow needle disposed on one end of a needle assembly. The needle assembly is slidably movable back and forth between a retracted position disposed substantially within the casing and an extend position disposed substantially out of the casing through the needle assembly opening. The hand tool further has a trigger that is pivotally mounted within the casing that extends out from the trigger slot. The trigger is capable of moving the needle assembly between the retracted and extended positions. The hand tool further has an anvil. The anvil has a finger guide portion, a main portion, and a tag slot. The tag slot separates the finger guide portion from the main portion.

The present invention also relates to a method of using a hand tool to dispense plastic fasteners to attach a hangtag to an article of clothing. The method includes the steps of, first, providing a hand tool having a gun shaped casing having a barrel portion and a handle portion. The casing has a needle assembly opening at the front of the barrel portion. The hand tool further has a hollow needle, a needle assembly, a trigger and an anvil. The anvil has a finger guide portion, a main portion, and a tag slot that separates the finger guide portion from the main portion. Next, the method includes the step of inserting a hangtag into the tag slot and placing the anvil against an article. Then, the trigger is depressed to advance the needle assembly forward until the hollow needle pierces the hangtag and the article. The trigger is then further depressed to dispense a plastic fastener through the hollow needle to attach the hangtag to the article. The method concludes by releasing the trigger to retract the needle assembly.

The present invention also relates to a method of replacing a worn needle in a hand tool for dispensing plastic fasteners. The method includes the steps of, first, providing a hand tool having a gun shaped casing having a barrel portion and a handle portion. The casing has a needle assembly opening at the front of the barrel portion. The hand tool further has a hollow needle, a needle assembly, a trigger and an anvil. The anvil has a finger guide portion a main portion and a tag slot that separates the finger guide portion from the main portion. The method then includes the step of providing a replacement needle having a protective needle casing. The replacement needle has a tip, a stem, and a base portion. The needle casing has a first end, a second end, and a tubular body. The tip and the stem of the replacement needle are inserted into the first end of the casing. Next, the method includes the step of inserting the second end of the needle casing into the finger guide portion of the anvil. Then, the trigger is depressed to advance the needle assembly forward until the tip and stem of the hollow needle are inserted into the second end of the needle casing. Next the method includes the step of removing the needle casing from the finger guide portion of the anvil and releasing the trigger. Then, the first end of the needle casing is inserted into the finger guide portion of the anvil. Next, the trigger is depressed to advance the needle assembly forward until the replacement needle is disposed with the needle assembly. The method concludes by removing the needle casing from the finger guide portion and releasing the trigger.

The present invention also relates to a method of adjusting an anvil of a hand tool for dispensing plastic fasteners. The method includes the steps of, first, providing a hand tool having a gun shaped casing having a barrel portion and a handle portion. The casing has a needle assembly opening at the front of the barrel portion. The hand tool further has a hollow needle, a needle assembly, a trigger and an anvil. The anvil has a finger guide portion a main portion and a tag slot that separates the finger guide portion from the main portion. The anvil further has a ball plunger that protrudes into the tag slot. Next, the method involves the step of adjusting the ball plunger so that the ball plunger protrudes into the tag slot only slightly. The method concludes with the step of inserting a hangtag into the tag slot and moving the hangtag in the tag slot while adjusting the ball plunger to cause the ball plunger to protrude further into the tag slot until a resistance is felt on the hangtag.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
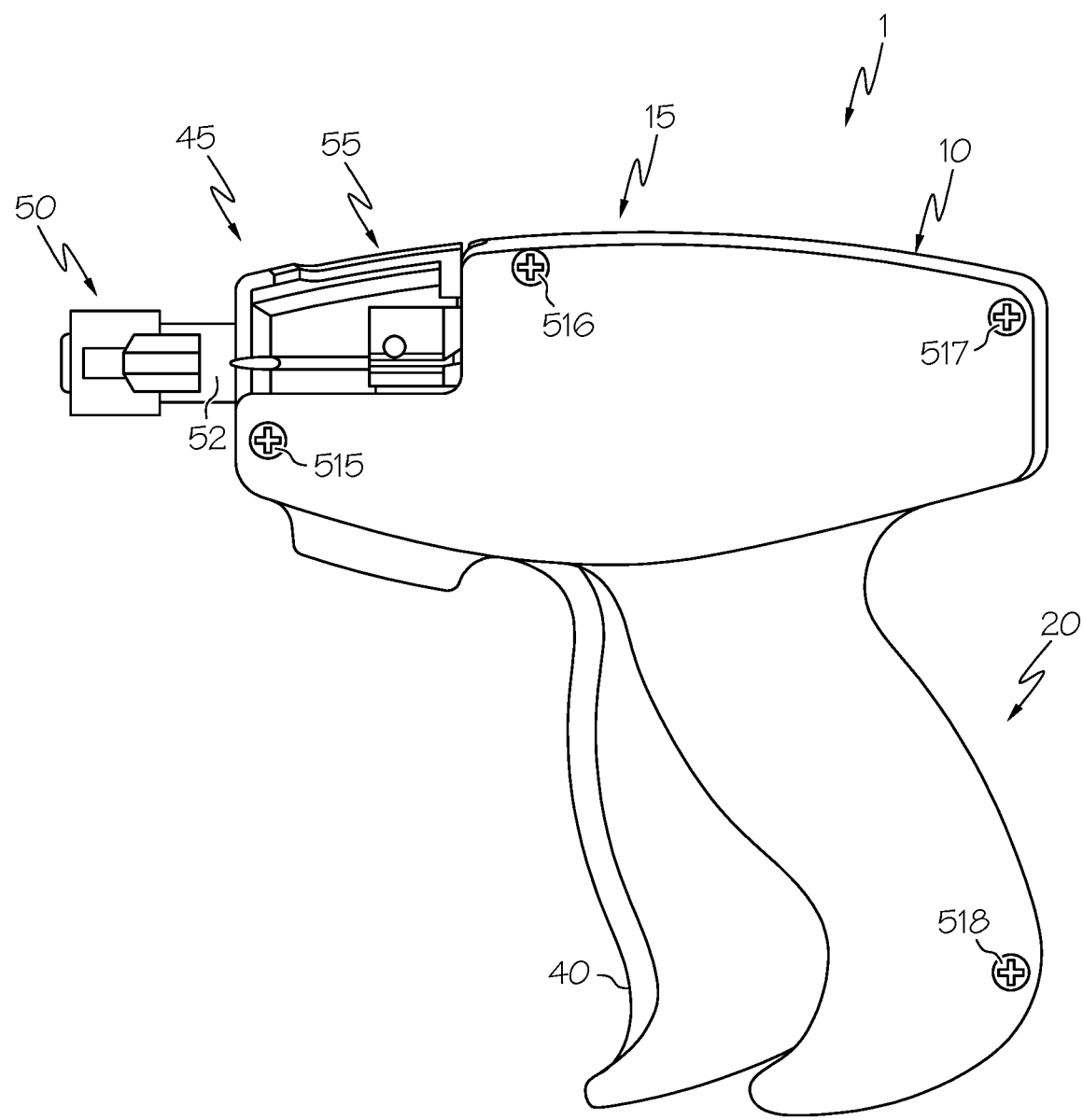
FIG. 1 is a side view of the left side of the present invention.
Figure 2:
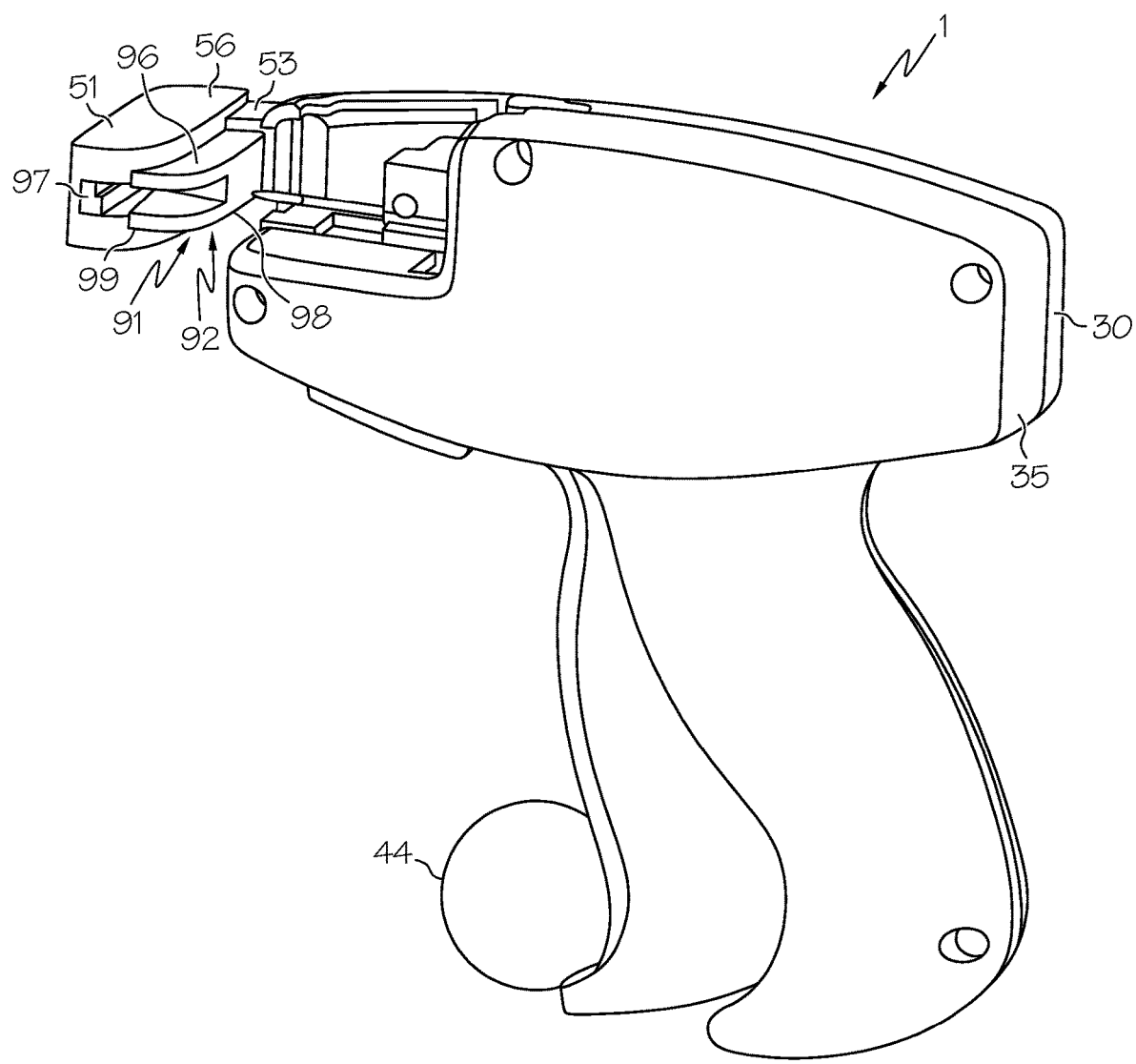
FIG. 2 is a perspective view of the front left side of the present invention with the needle assembly retracted into the casing.
Figure 3:
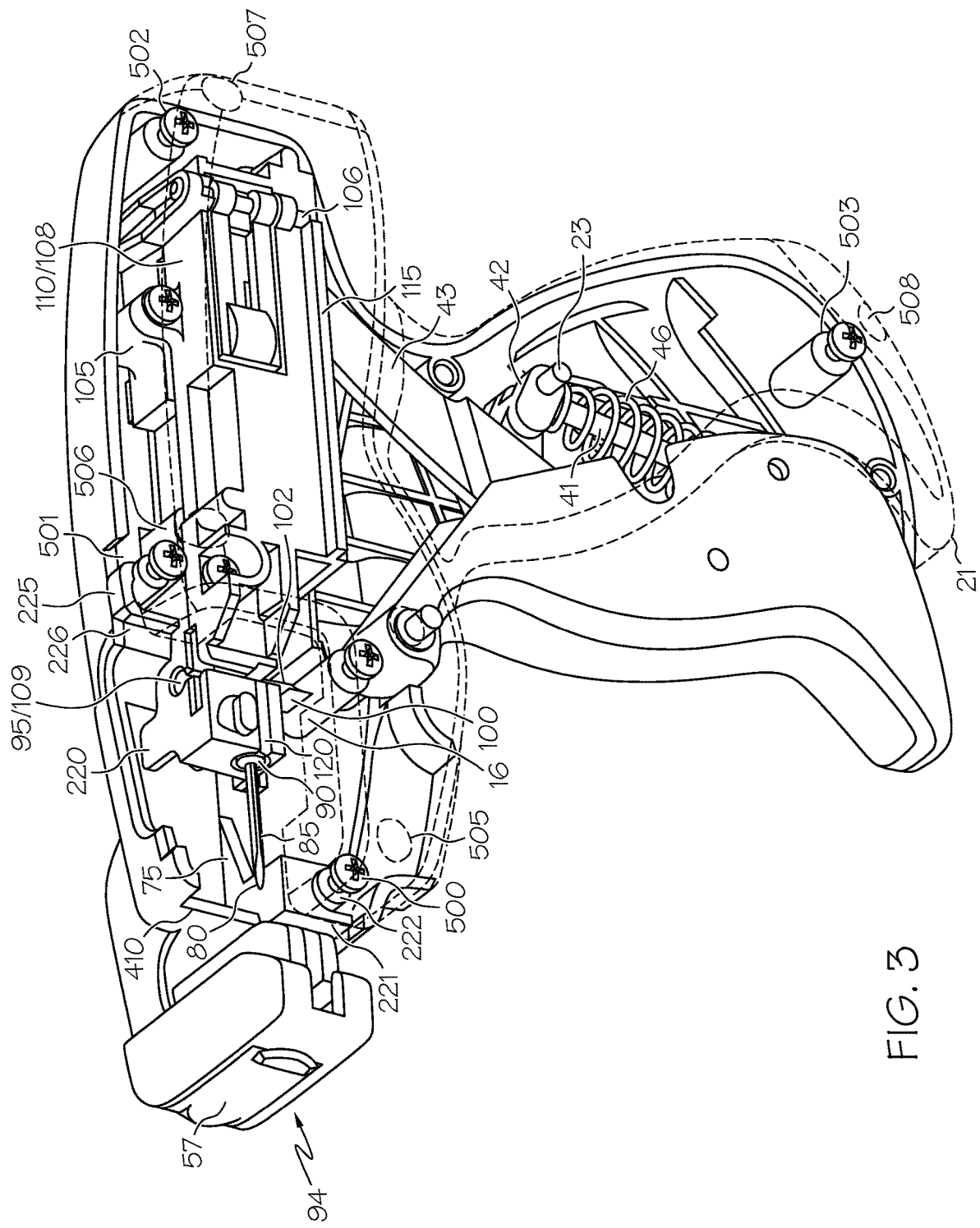
FIG. 3 is a perspective cutaway view of the front left side of the present invention with the needle assembly retracted into the casing.

Referring now to FIGS. 1, 2, and 3 a plastic fastener dispensing hand tool 1 is shown. It should be noted that portions of the hand tool 1 not pertinent to the present invention are neither shown nor described in detail herein. The hand tool 1 has a gun shaped casing 10. The gun shaped casing 10 has a barrel portion 15 and a handle portion 20. The casing 10 is comprised of a right half 30 and a left half 35. The halves 30, 35 jointly define a needle assembly opening 16 located near the front of the barrel portion 15 and a trigger slot 21 located at the front of the handle portion 20. A plurality of four assembly posts 500, 501, 502, 503 are formed into the right half 30. The first assembly post 500 is located near the front of the barrel portion 15, the second assembly post 501 is located near the front of the needle assembly opening 16, the third assembly post 502 is located near the back of the barrel portion 15, and the fourth assembly post 503 is located near the bottom of the handle portion 20. A plurality of four assembly holes 505, 506, 507, 508 are formed on the left half 35. The position of the four assembly holes 505, 506, 507, 508 correspond with the position of the four assembly posts 500, 501, 502, 503 when the left half 35 and the right half 30 of the casing 10 are brought together. The left half 35 and the right half 30 of the casing 10 are secured together by a plurality of four assembly screws 515, 516, 517, 518 that are driven through the assembly holes 505, 506, 507, 508 and into the assembly posts 500, 501, 502, 503.

A trigger 40 is pivotally attached to the casing 10 and extends though the trigger slot 21. A first trigger arm 41 extends from the bottom of the trigger 40. One end of the first trigger arm 41 is pivotally connected to the bottom of the trigger 40, while the other end of the first trigger arm 41 is pivotally anchored in the middle of the handle portion 20 at an anchor point 23. A second trigger arm 42 connects the first trigger arm 41 to a needle assembly arm 43. One end of the second trigger arm 42 is pivotally anchored to the first anchor point 23, while the other end of the second trigger arm 42 is pivotally connected to the needle assembly arm 43. The trigger 40 also may include a ring 44 (see FIG. 2) which can assist the user when pulling the needle back through the layers of material.

Figure 2A:
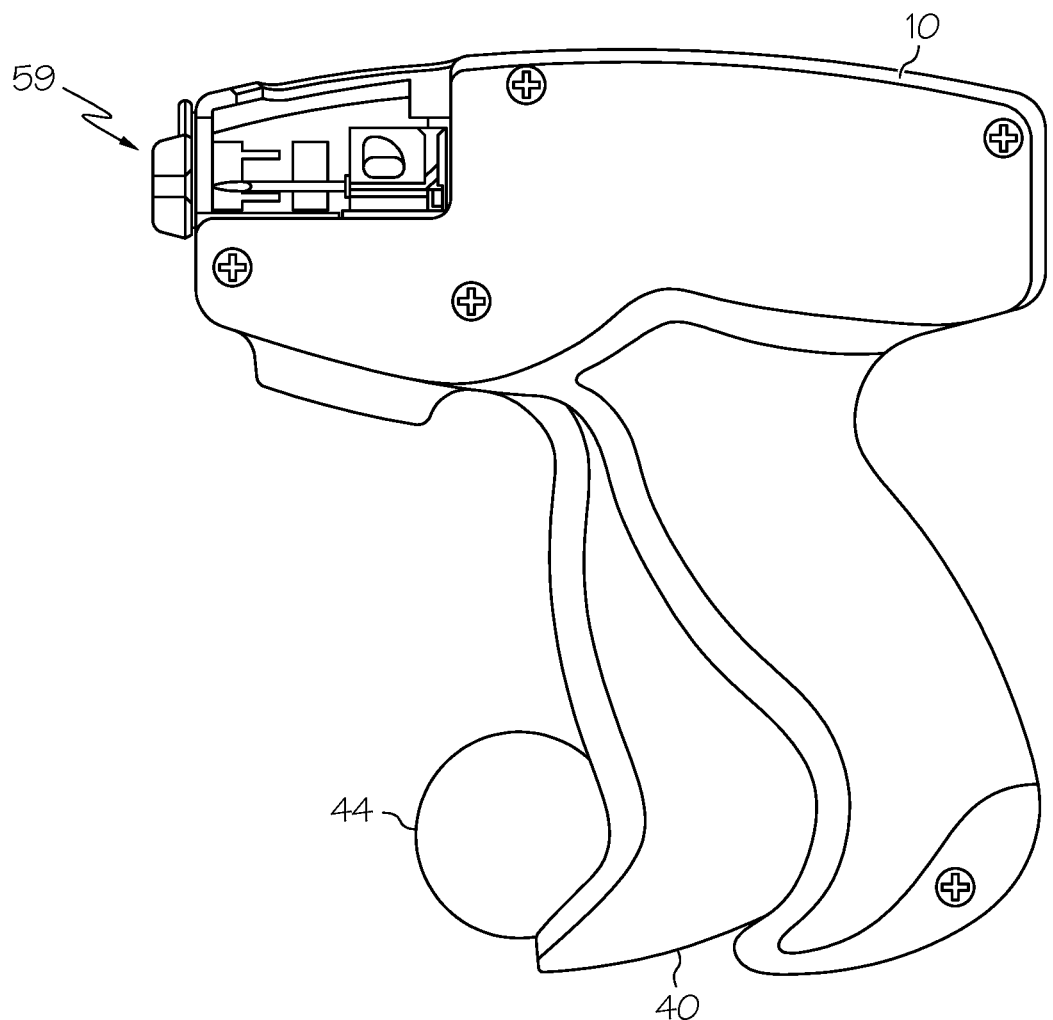
FIG. 2A is an illustration of an alternate configuration for a blunt nose for the needle guard.

FIG. 2A provides an alternate configuration for the needle guard 59 which is a blunt or domed shaped nose. The domed nose aids in moving the user's fingers away from the needle guard due to the rounded shape of the guard 59 of the tool 1.

Figure 4:
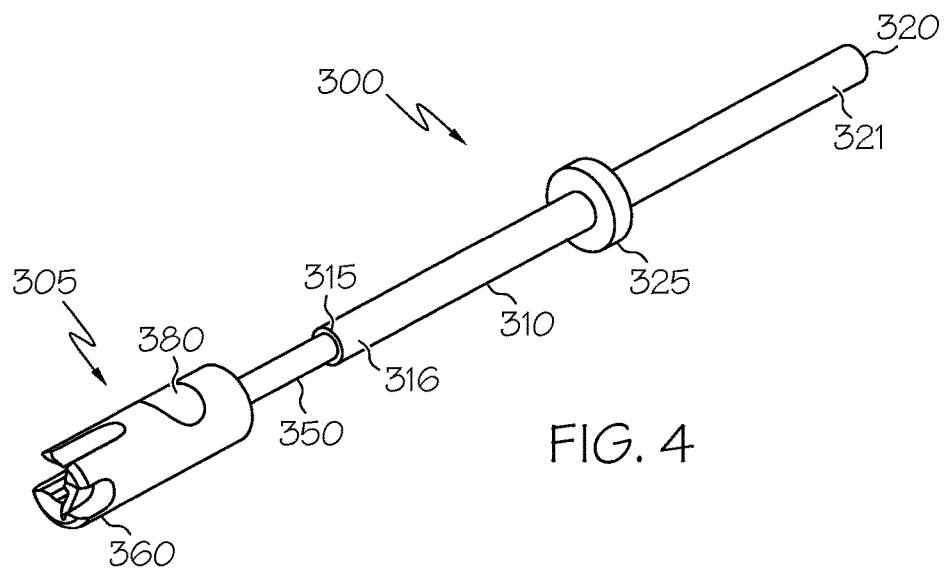
FIG. 4 is an enlarged side view of the left side of the present invention showing the anvil in detail.
Figure 5:
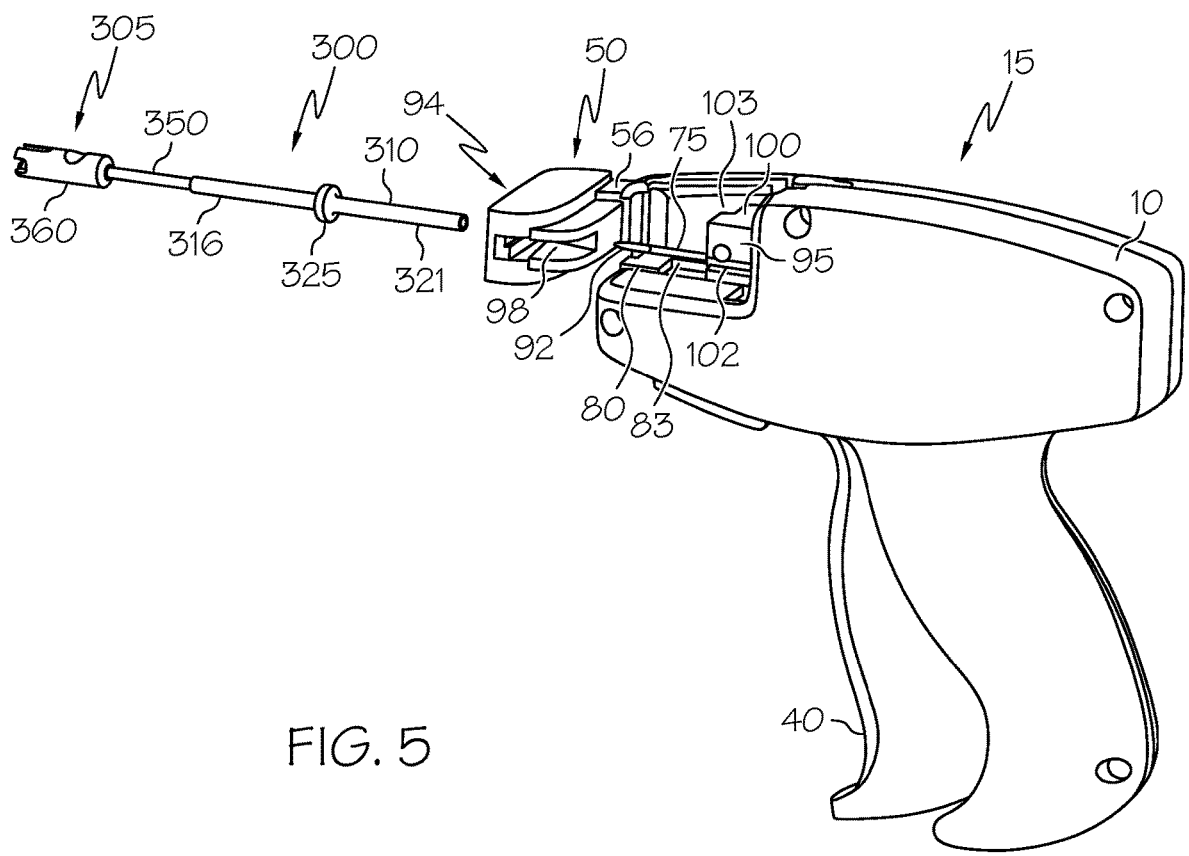
FIG. 5 is an enlarged perspective view of the front left side of the present invention showing the anvil in detail.

Referring now to FIGS. 3, 4, and 5, the hand tool 1 has an anvil 45 mounted at the front of the barrel portion 15. The anvil 45 has a finger guide portion 50 and a main portion 55. A finger guide 51 is provided on the finger guide portion 50 of the anvil 45. The finger guide 51 has a tip 91 and a base 92. The finger guide portion 50 further has a rear wall 81, a circular passage 93, and a needle sight channel 94. The circular passage 93 extends through the finger guide portion 50 from the tip 91 of the finger guide 51 to the rear wall 81 of the finger guide portion 50. The needle sight channel 94 provides visual access to the circular passage 93, and is located along the left side of the finger guide portion 50.

Figure 10:
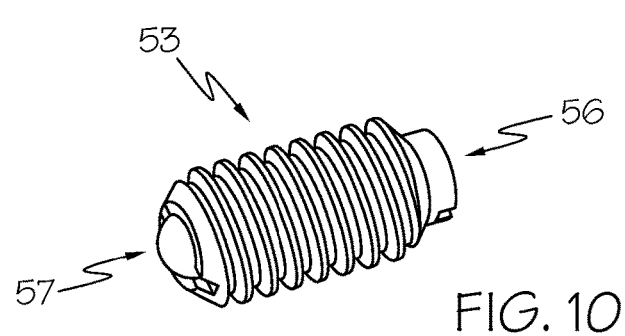
FIG. 10 is an enlarged perspective view of the front left side of a ball plunger.

A tag slot 52 separates the finger guide portion 50 from the main portion 55. The tag slot 52 extends substantially perpendicular to the length of the anvil 45, and extends nearly the entire width of the anvil 45. The anvil 45 is further provided with a ball plunger housing 58 located at the front of the main portion 55. The ball plunger housing 58 contains a threaded ball plunger 53 (shown in detail in FIG. 10). The ball plunger 53 has a ball end 57 and a slotted end 56. The ball plunger 53 is threaded into the ball plunger housing 58 with the ball end 57 of the ball plunger 53 protruding into the tag slot 52, and the slotted end 56 facing towards the rear of the anvil 45. A limiter wall 410 extends upwardly from the ball plunger housing 58, while a first anvil tab 221 extends downwardly from the ball plunger housing 58. The first anvil tab 221 is substantially square shaped and has a U-shaped channel 222. A second anvil tab 225 is provided toward the rear of the main portion 55. The second anvil tab 225 consists of a U-shaped channel 226 formed integrally into the right rear wall of the main portion 55.

The first anvil tab 221 and the second anvil tab 225 cooperate with the first assembly post 500 and the second assembly post 501 to secure the anvil 45 to the front of the barrel portion 15. The U-shaped channel 222 of the first anvil tab 221 engages the first assembly post 500, while the U-shaped channel 226 of the second anvil tab 225 engages the second assembly post 501. As the assembly screws 505, 506, 507, 508 are driven through the assembly holes and into the assembly posts 500, 501, 502, 503 to secure the right half 30 and the left half 35 of the casing 10 together, the right half 30 and the left half 35 of the casing 10 begin to exert force onto the first and second anvil tabs 221, 225 that extend between the right half 30 and the left half 35 of the casing 10. Once the assembly screws 505, 506, 507, 508 are fully tightened and the right half 30 and the left half 35 of the casing 10 are tightly secured together, the force created by the right half 30 and the left half 35 of the casing 10 on the first and second anvil tabs 221, 225 further assists the first and second anvil tab U-shaped channels 222, 226 in securing the anvil 45 to the front of the barrel portion 15 of the hand tool 1.

The hand tool 1 further has a hollow needle 75. The needle 75 has a tip 80, a stem portion 85, and a base portion 90. The base portion 90 is mounted inside a needle slide 95. A limiter 220 extends from the top front edge of the needle slide 95. The base portion 90 is secured to the needle slide 95 by a needle lock 100. The needle lock 100 has a threaded portion 101 (not shown) and a slotted end 102. The threaded portion 101 is driven into a needle lock opening 103. The needle lock opening 103 intersects a portion of the base portion 90 of the needle 75 when the needle 75 is mounted inside the needle slide 95. The base portion has a needle lock channel 104 (not shown) that lines up with the needle lock opening 103 when the needle 75 is mounted inside the needle slide 95. When the needle lock 100 is completely driven into the needle lock opening 103, the needle lock 100 is received by the needle lock channel 104, thereby locking the hollow needle 75 to the needle slide 95.

A needle slide cover 110 is attached to the needle slide 95. The needle assembly arm 43 extends downwardly from the bottom of the needle slide cover 110. Together, the needle slide 95 and the needle slide cover 110 form a needle assembly 105. When the needle slide 95 and the needle slide cover 110 are secured to one another to form the needle assembly 105, the needle slide cover 110 constitutes a left needle assembly 108, and the needle slide 95 constitutes a right needle assembly 109. A first ridge 106 extends lengthwise along the bottom edge of the left needle assembly 108, and a second ridge 107 extends lengthwise along the bottom edge of the right needle assembly 109. A first channel 115 (not shown) is formed on the interior of the barrel portion 15 of the left half 35. A second channel 120 is formed on the interior of the barrel portion 15 of the right half 30. The first and second channels 115, 120 extend substantially parallel from the front to the rear of the barrel portion 15. The first and second channels 115, 120 cooperate with the first and second ridges 106, 107 to slidably secure the needle assembly 105 within the barrel portion 15 and limit the needle assembly 105 to movement lengthwise within the barrel portion 15.

Figure 8:
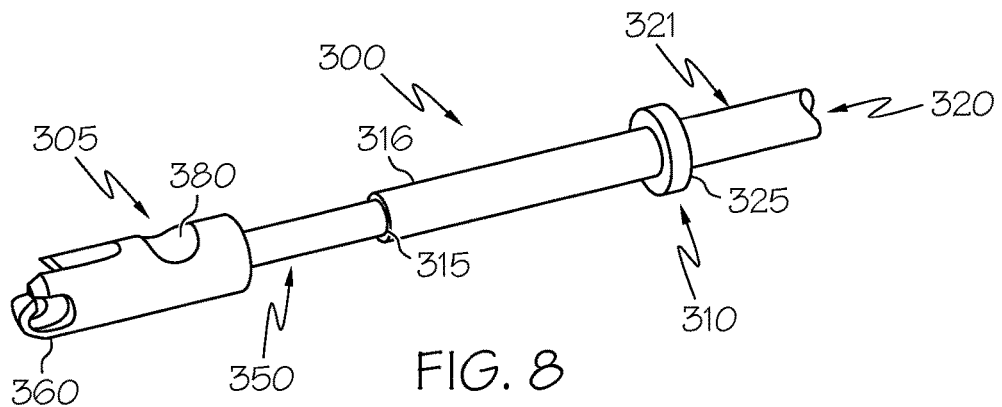
FIG. 8 is a perspective view of the front left side of a replacement needle and a needle casing used with the hand tool of the present invention.

Referring now to FIG. 8, a needle casing 300 is shown holding a replacement needle 305. The needle casing 300 has a substantially cylindrical shaped body 310. The needle casing 300 has a first opening 315 at a first end 316 of the body 310, and a second opening 320 at a second end 321 of the body 310. The cylindrical shaped body 310 has a diameter slightly larger than that of the circular passage 93 of the anvil 45. The openings 315, 320 have a diameter slightly smaller than that of the replacement needle 305. Therefore, an interference fit is created between the first opening 315 and the replacement needle 305 when the replacement needle 305 is inserted into the first opening 315. This interference fit causes the replacement needle 305 to be retained within the first opening 315.

A limiting ridge 325 is provided on the middle of the protective casing 300. The limiting ridge 325 facilitates the replacement of the hand tool 1 needle 75 while also assisting in the manipulation of the needle casing 300 by an operator of the hand tool 1. The replacement needle 305 has a tip 340 (not shown) a stem portion 350 and a base 360. The base portion 360 has a needle lock channel 380.

With reference directed to FIGS. 3, 5, 6, and 7, it will now be explained how the hand tool for dispensing plastic fasteners 1 is used to attach a hangtag to an article. It should be noted that operations of the hand tool 1 not pertinent to the present invention are not described in detail herein.

Figure 6:
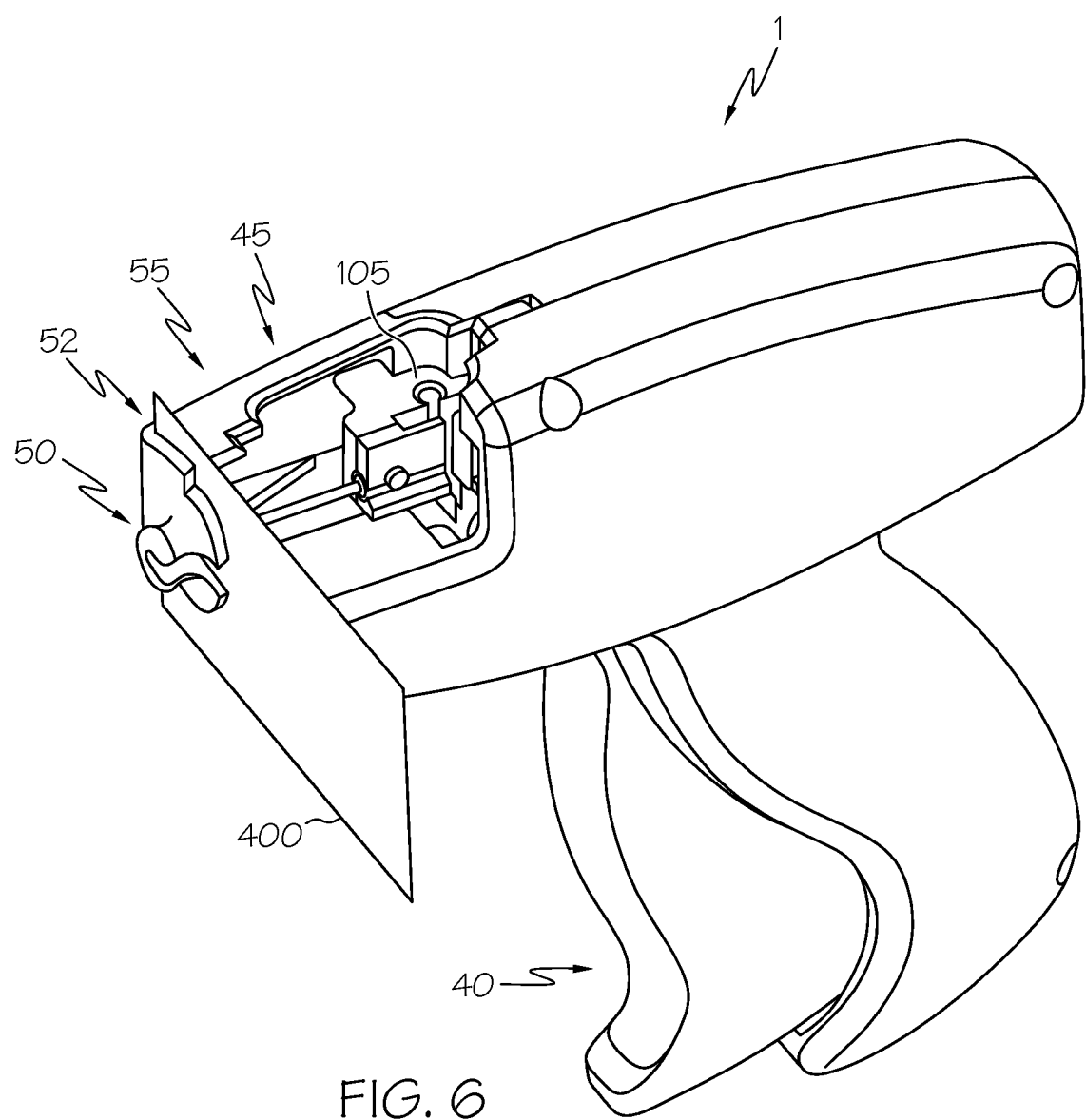
FIG. 6 is a perspective view of the front left side of the present invention with a hangtag being secured in the anvil of the hand tool and the needle assembly retracted into the casing.
Figure 7:
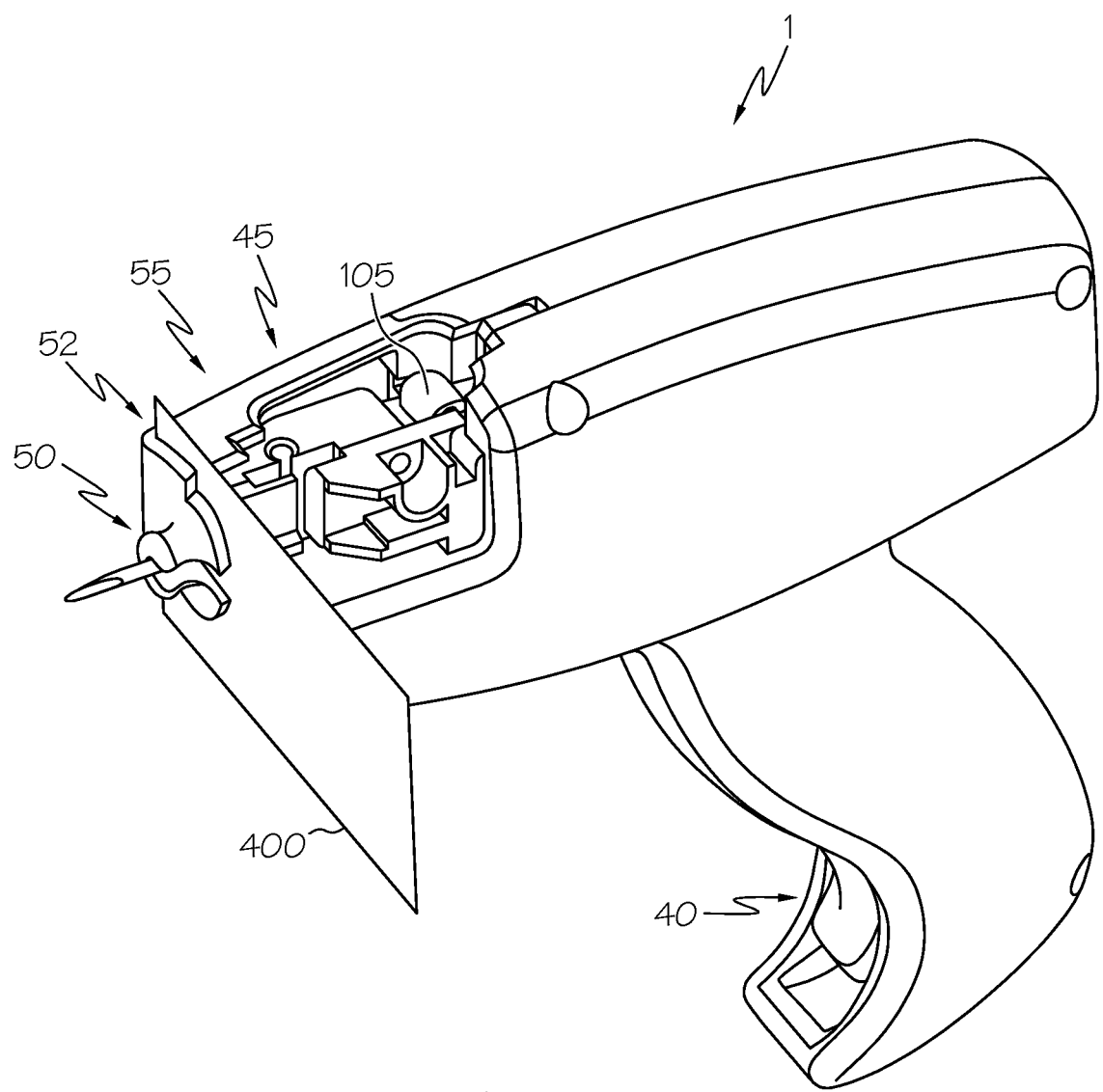
FIG. 7 is a perspective view of the front left side of the present invention with a hangtag being secured in the anvil of the hand tool and the needle assembly extended from the casing.

To begin the operation of attaching a hangtag to an article, the operator first secures a hangtag 400 within the anvil 45 of the hand tool 1. In FIG. 6, the hand tool 1 is shown with a hangtag 400 secured to the anvil 45, and the needle assembly 105 retracted into the barrel portion 15 of the housing 10. The hangtag 400 is secured within the tag slot 52 of the anvil 45 between the finger guide portion 50 and the main portion 55. It should be noted that the construction of the anvil 45 allows the hangtag 400 to be secured within the anvil 45 without any additional assistance from the operator. Therefore, the operator may let go of the hangtag 400 once the operator has placed the hangtag 400 into the tag slot 52, and the hangtag 400 will remain fixated between the finger guide portion 50 and the main portion 55 of the anvil 45.

The hangtag 400 is fixated between the finger guide portion 50 and the main portion 55 of the anvil 45 by the ball plunger 53. As described above, the ball plunger 53 is threaded into the ball plunger housing 58 with the ball end protruding into the tag slot 52, and the slotted end 56 facing toward the rear portion of the anvil 45. The ball end 57 exerts just enough force on the hangtag 400 to lightly pin the hangtag 400 against the rear wall 81 of the finger guide portion 50. It is contemplated that other means may be used to lightly pin the hangtag 400 against the rear wall 81 of the finger guide portion 50. For example, it is contemplated that a spring-loaded ball plunger may be employed, or that the ball end 57 of the ball plunger 53 may be replaced with a roller wheel.

It should be noted that the ball plunger 53 is adjustable to accommodate hangtags having different thicknesses. To adjust the ball plunger 53, the operator begins by inserting a tool into the slotted end 56 of the ball plunger 53. With the tool inserted, the operator may now use the tool to rotate the ball plunger 53 until the desired adjustment level is achieved. Rotating the ball plunger 53 clockwise causes the ball plunger 53 to be driven into the ball plunger housing 58 thereby causing the ball end 57 to protrude further into the tag slot 52 to accommodate thinner hangtags, while rotating the ball plunger 53 counter clockwise causes the ball plunger 53 to be driven out of the ball plunger housing 58 thereby causing the ball end 57 to protrude less into the tag slot 52 to accommodate thicker hangtags.

The operator must take care to properly adjust the ball plunger 53 to ensure smooth operation of the hand tool 1. If the operator adjusts the ball plunger 53 so that the ball end 57 protrudes to far into the tag slot 52, the operator will not be able to slide the hangtag between the ball end 57 and the rear wall 81 of the finger guide portion 50, or the operator will end up bending the hangtag as he or she attempts to force the hangtag between the ball end 57 and the rear wall 81 of the finger guide portion 50. Alternatively, if the operator adjusts the ball plunger so that the ball end 57 does not protrude far enough into the tag slot 52, the operator will not be able to get the hangtag to remain fixated between the finger guide portion 50 and the main portion 55 of the anvil 45.

To quickly and accurately adjust the ball plunger 53, the operator begins by first backing the ball plunger 53 out of the ball plunger housing 58 until the ball end 57 is completely retracted from the tag slot 52. Next, the operator places a single hangtag into the tag slot 52. The operator will then begin to move the hangtag up and down within the tag slot 52 while ensuring that part of the hangtag remains in front of the ball end 57 of the ball plunger 53. While moving the hangtag up and down within the tag slot 52, the operator will begin to slowly turn the ball plunger 53 clockwise to advance the ball plunger 53 into the ball plunger housing 58, thereby increasing the amount by which the ball end 57 protrudes into the tag slot 52. The operator will continue to move the hangtag up and down while rotating the ball plunger 53 clockwise until the operator feels a slight resistance in the movement of the hangtag. Once this slight resistance is felt, the operator will then rotate the ball plunger 53 an additional one eighth of a turn clockwise to complete the adjustment. Using this procedure, the operator will easily be able to adjust the hand tool 1 so that the hangtag is easily slid into the tag slot 52 while still ensuring that the hangtag is retained in the tag slot 52. The operator may then continue using the hand tool 1 without further adjustment as long as hangtags having the same thickness as the one being used to make the initial adjustments are used. However, if the operator wishes to use hangtags having a different thickness, the above adjustment process will have to be repeated to ensure that the hand tool 1 will continue to function properly.

With the hangtag 400 now secured in the tag slot 52 between the ball end 57 of the ball plunger 53 and the rear wall 81 of the finger guide portion 50, the operator can then place the tip 91 of the finger guide 51 against the article the operator wishes to attach the hangtag 400 to. For the purposes of this disclosure, it will be assumed that the hangtag 400 is being attached to a shirt. The operator must ensure that the shirt is tautly pulled over the tip 91 of the finger guide 51 to ensure that the tip 80 of the hollow needle 75 cleanly pierces the shirt. If the shirt is not tautly pulled over the tip 91 of the finger guide 51, the tip 80 of the hollow needle 75 may fail to pierce the shirt or may even cause the shirt to rip or tear.

It should be noted that the design of the finger guide 51 assists the operator in avoiding injury during period in which the operator is required to hold the shirt tautly against the tip 91 of the finger guide 51. When the operator initially places the tip 91 of the finger guide 51 against the shirt, the shirt will only be loosely draped over the tip 91 of the finger guide 51, and not taut as is desired. To achieve the desired tautness, the operator will first feel for the tip 91 of the finger guide 51 through the fabric of the shirt. Once the operator has located the finger guide 51, he or she will then push the fabric of the shirt against the finger guide 51 to cause the fabric of the shirt to be pulled taut against the tip 91. The shape of the finger guide 51 will cause the fingers of the operator to separate and move away from the tip 91 of the finger guide 51 and towards the base 92. Due to the shape of the finger guide 51, the fingers of the operator will naturally be biased away from the tip 91 and toward the base 92 whenever the hand tool 1 is used. This is highly desirable, as the tip 80 of the needle 75 exits from the tip 91 of the finger guide 51 when the hand tool 1 actuated. Because the design of the finger guide 51 directs the fingers of the operator away from the tip 91 of the finger guide 51 and towards the base 92, the operator of the hand tool 1 is less likely to cause injury to himself or herself once the hand tool 1 is actuated because the fingers of the operator will be far away from the path of the needle 75.

It should be noted that the finger guide 51 may have several different design configurations. For example, the finger guide 51 is shown having a dome shape in FIGS. 1, 2, 3 and a cone shape in FIGS. 5, 6, 7, and 9. The only design requirement of the finger guide 51 is that the shape of the finger guide 51 must direct the fingers of the operator away from the tip 91 of the finger guide 51 and towards the base 92 whenever an operator places his or her fingers against the finger guide 51. Because the anvil 45 is removable from the hand tool 1, the operator may select the shape of the finger guide 51 depending on his or her personal preference, or depending on the application that the hand tool 1 is being used for.

To exchange the anvil 45, the operator first loosens, but does not remove, two of the four assembly screws 515, 516, 517 518. This allows the left half 35 and the right half 30 of the casing 10 to slightly be pulled apart from one another. As noted above, the right half 30 and the left half 35 of the casing 10 exert a force on the first and second anvil tabs 221, 225 that extend between the right half 30 and the left 35 of the casing 10 to assist in securing the anvil 45 to the front of the barrel portion. Loosening the assembly screws 515, 516, 517, 518 removes this force and allows the anvil 45 to be removed from the hand tool 1. With the assembly screws loosened 506, 507, 508, 509, the operator may now remove the anvil 45 from the hand tool 1. To install the new anvil 45, the operator must first align the first and second anvil tabs 221, 225 with the first and second assembly posts 500, 501. The operator then lowers the anvil 45 into the front of the barrel portion 15 so that the U-shaped channel 222 of the first anvil tab 221 engages the first assembly post 500, while the U-shaped channel 226 of the second tab 225 engages the second assembly post 501. The operator completes the anvil exchange process by tightening the assembly screws 516, 517, 518, 519, thereby firmly securing the anvil 45 to the hand tool 1 while also securing the right half 30 and the left half 35 of the casing 10 back together.

With the hangtag now secured in the tag slot 52 between the ball end 57 of the ball plunger 53 and the rear wall 81 of the finger guide portion 50, and the fabric of the shirt pulled tautly against the tip 91 of the finger guide 51, the operator next depresses the trigger 40 to actuate the hand tool 1, thereby causing the trigger 40 to retract into the trigger slot 21. The retraction of the trigger 40 into the trigger slot 21 causes the first trigger arm 41 to rotate clockwise about the anchor 23, thereby causing the second trigger arm 42 to also rotate clockwise about the anchor 23. The rotation of the second trigger arm 42 causes the needle assembly arm 43 to pivot away from the back of the handle portion 20 and toward the front of the barrel portion 15. Because the needle assembly arm 43 is connected to the needle assembly 105, this movement of the needle assembly arm 43 causes the needle assembly 105 to move toward the front of the barrel portion 15. The needle assembly 105 continues to move forward until the limiter 220 on the needle slide 95 makes contact with the limiter wall 410 of the anvil 45, thereby preventing the needle assembly 105 from further advancing to the front of the barrel portion 15. As the needle assembly 95 is advanced to the front of the barrel portion 15, the hollow needle 75 mounted to the needle assembly 105 is likewise advanced. As the hollow needle 75 is advanced, the tip 80 pierces the hangtag secured in the tag slot 52, travels through the circular passage 93 of the finger guide portion 50, and passes beyond the tip 91 of the finger guide 51 to pierce the fabric of the shirt. Once the limiter 220 makes contact with the limiter wall 410, the tip 80 and part of the stem portion 85 of the needle 75 extend beyond the tip 91 of the finger guide 51. Further depression of the trigger 40 by the operator causes a plastic fastener to be dispensed through the sharpened tip 80 of the hollow needle 75, thereby securing the hangtag 400 to the shirt.

Once the plastic fastener is dispensed from the hand tool 1, the operator can release the trigger 40. The needle assembly 95 is under a rearward bias that causes the needle assembly 95 to retreat toward the back of the barrel portion 15 once the trigger is released 21. The movement of the needle assembly 95 to the rear of the barrel portion 15 will also cause the trigger 40 to extend from the trigger slot 21. As the needle assembly 95 returns to the back of the barrel portion 15, the needle 75 likewise is retracted from the fabric of the shirt, the finger guide portion 50, the hangtag 400, and the main portion of the anvil 55. With the needle 75 and needle assembly 95 retracted, the operator can then remove the hangtag 400 that is now attached to the shirt from the tag slot 52 and place a new hangtag into the tag slot 52 and repeat the above described process on another shirt to continue attaching hangtags.

Figure 9:
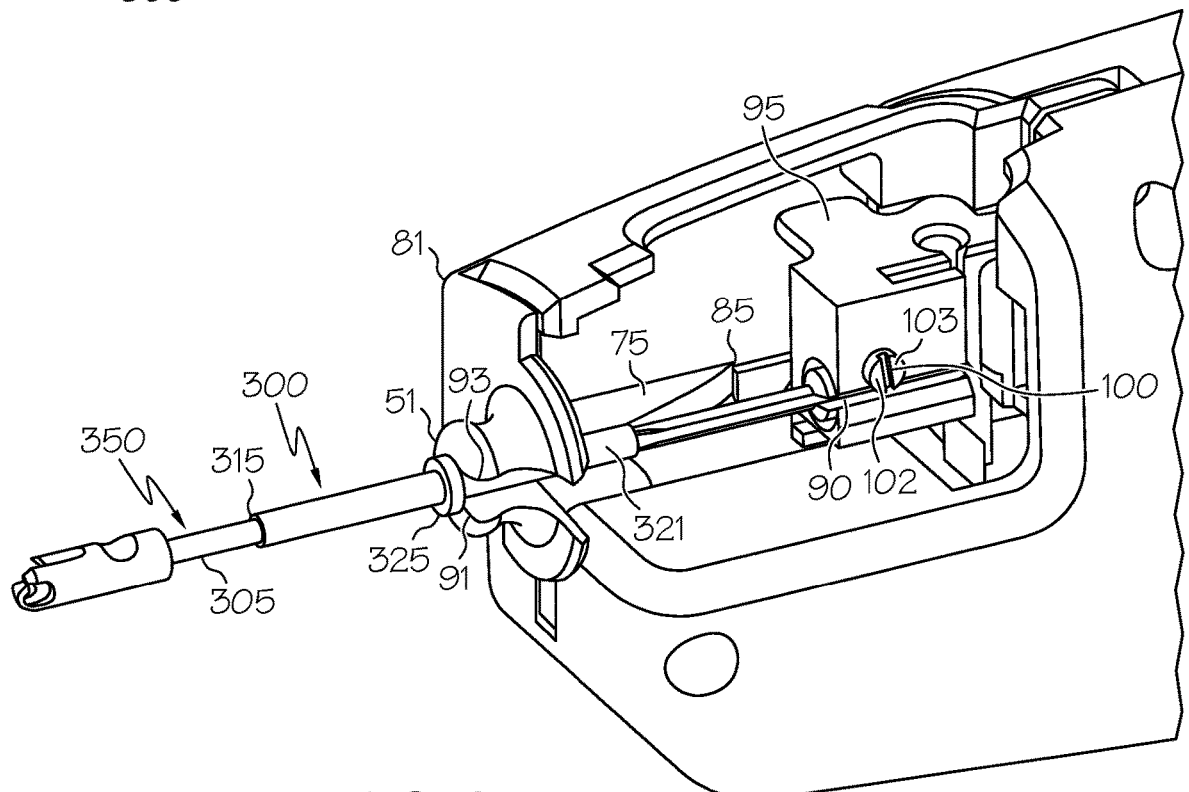
FIG. 9 is an enlarged perspective view of the front left side of the present invention showing the process of using the needle casing to remove a worn needle from the hand tool.

Now directing attention towards FIGS. 8 and 9, it will now be explained how the needle casing 300 is used to replace a worn needle with a new needle. FIG. 8 depicts how the replacement needle 305 for the hand tool 1 is shipped. The replacement needle 305 is shipped with the tip 340 and part of the stem portion 350 of the needle 305 firmly inserted into the first opening 315 of the needle casing 300. Shipping the replacement needle 305 with the casing 300 already installed serves two purposes. First, it protects any person who comes in contact with the replacement needle 305 during the shipment or storage of the replacement needle 305 from accidental needle sticks. Second, it protects the tip 340 of the replacement needle 305 from becoming dulled and further protects the stem 350 of the needle 305 from bending or breaking.

To begin the replacement of a worn needle, the operator first inserts the second end 321 of the needle casing 300 into the tip 91 of the finger guide 51 and into the circular passage 93. The operator then pushes the needle casing 300 into the finger guide 51 toward the rear wall 81 of the finger guide portion 50 until the limiting ridge 325 makes contact with the tip 91 of the finger guide 51, thus preventing the needle casing 300 from further being inserted into the circular passage 93. As described above, the diameter of the cylindrical shaped body 310 of the needle casing 300 is slightly larger than that of the circular passage 93 of the finger guide portion 50. Therefore, once the needle casing 300 has been inserted and pushed into the tip 91 of the finger guide 51, the operator may release the needle casing 300 and the needle casing 300 will remain disposed within the anvil 45 as a result of the interference fit created between the body 300 of the needle casing 300 and the circular passage 93 of the finger guide portion 50.

Next, to continue with the replacement of the worn needle, the operator removes the needle lock 100 from the needle lock opening 103 by inserting a tool into the slotted end 102 of the needle lock 100 and rotating the needle lock 100 counterclockwise. Once the needle lock 100 has been removed from the needle lock opening 103, the base portion 90 is no longer secured within the needle slide 95, and thus the hollow needle 75 is free to be removed from the hand tool 1. With the limiting ridge 325 in contact with the tip 91 of the finger guide 51, the tip 80 of the hollow needle 75 is partially inserted into the second opening 320 of the needle casing 300. However, because the stem portion 85 of the needle 75 is not yet inserted into the second opening 320, an interference fit between the needle 75 and the needle casing 300 has not yet been established, and thus the needle casing 300 cannot yet be used to remove the needle 75 from the hand tool 1.

To create the necessary interference fit, the operator must first grasp the needle casing 300 and push the needle casing 300 toward the rear wall 81 of the finger guide portion 50 to ensure that the limiting ridge 325 remains in firm contact with the tip 91 of the finger guide 51. Although, as described above, the needle casing 300 is held in place in the circular passage 93 of the finger guide portion 50 as a result of the interference fit between the needle casing 300 and circular passage 93, the operator must still provide additional support to the needle casing 300 during this step of the needle replacement process. With the limiting ridge 325 pressed firmly against the tip 91 of the finger guide 51, the operator can then depress the trigger 40. As explained above, depression of the trigger 40 causes the needle assembly 105 to move toward the front of the barrel portion 15. This movement of the needle assembly 105 causes the tip 80 of the needle 75 to be forced further into the second opening 320 such that the stem 85 is also forced into the second opening 320 thereby creating the desired interference fit between the stem 85 of the needle 75 and the needle casing 300. With the needle 75 now securely held in the second opening 320 of the needle casing 300, the operator can remove the second end 321 of the body 310 from the circular passage 93 of the finger guide portion 50 to remove the needle 75 from the hand tool 1.

Next, the operator flips the casing 300 to orient the first end 316 of the needle casing 300 toward the opening of the finger guide 51. Similar to the process described above with regard to the second end 321, the operator inserts the first end 316 of the needle casing 300 into the tip 91 of the finger guide 51 and pushes the needle casing 300 toward the rear wall 81 of the finger guide portion 50 until the limiting ridge 325 makes contact with the tip 91 of the finger guide 51. This positions the base 360 of the replacement needle 305 directly in front of the needle slide 95. However, with the trigger 40 no longer depressed, the needle slide 95 will be spaced apart from the base 360 of the replacement needle 305. Therefore, the operator must depress the trigger 40 to cause the needle assembly 105 to move forward to bring the needle slide 95 in make contact with the base 360 of the replacement needle 305. With the trigger 40 still depressed and the base 360 of the replacement needle 305 resting within the needle slide 95, the operator can place the needle lock 100 back into the needle lock opening 103 by inserting a tool into the slotted end 102 of the needle lock 100 and rotating the needle lock 100 clockwise. Once the needle lock 100 is securely disposed within the needle lock opening 103, the base of the replacement needle 305 is secured to the hand tool 1. However, the force of the interference fit between the stem 350 of the replacement needle 305 and the first opening 315 of the needle casing 300 is stronger than the force of the rearward bias of the needle assembly 105. Therefore, the operator must remove the needle casing 300 from the circular passage 93 of the anvil 45 to free the replacement needle 305 from the needle casing 300. The needle assembly 105 is then free to return to the rear of the barrel portion 15 of the casing 10 once the needle casing 300 has been removed, and the hand tool 1 is ready for further use with the replacement needle 305 installed It will thus be seen that a novel plastic fastener dispensing hand tool has been described. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method of transitioning a dual operating mode hand tool for dispensing plastic fasteners between a first operating mode and a second operating mode comprising the steps of:
   providing a hand tool having a casing with a barrel portion, a
   handle portion, and a channel a portion, said casing having a needle assembly opening at a front end of the barrel portion, a hollow needle, a needle assembly, a trigger, a locking switch, and an anvil, said anvil having a front portion and a rear portion;
   rotating said front portion of said anvil from a first operating mode position near the front of said barrel portion to a second operating mode position near said channel portion;
   depressing a safety button wherein the safety button includes an elongated portion and a safety button face and wherein a first tooth and a second tooth extend from a shelf that projects from the elongated portion;
   moving said safety switch to an unlocked position;
   actuating said trigger to advance said needle assembly from a first operating mode position at a rear end of said barrel portion to a second operating mode position at the front end of said barrel portion; and
   releasing said safety switch to lock said needle assembly in said second operating mode position.

2. The method of claim 1, wherein the safety button prevents the needle assembly from moving from a retracted position.

3. The method of claim 1, wherein the safety switch protrudes through an opening on an exterior of a barrel portion under a first locking switch face.

4. The method of claim 1, wherein the elongated portion is received within a first tunnel.

5. A method for transitioning a dual operating mode hand tool for dispensing plastic fasteners between a first operating mode and a second operating mode comprising the steps of:
   providing a dual operating mode hand tool for dispensing plastic fasteners having a gun shaped casing with a barrel portion with a front and rear, a handle portion, and a channel portion, said casing having a needle assembly opening at the front of the barrel portion, a hollow needle, a needle assembly, a trigger, a locking switch, a safety button, and an anvil, said anvil having a front portion and a rear portion;

rotating said front portion of said anvil from a first operating mode position near the front of said barrel portion to a second operating mode position near said channel portion;

depressing said safety button;

moving said safety switch to an unlocked position;

actuating said trigger to advance said needle assembly from a first operating mode position at the rear of said barrel portion to a second operating mode position at the front of said barrel portion; and releasing said safety switch to lock said needle assembly in said second operating mode position.

6. The method recited in claim 5, wherein said first operating mode dispenses plastic fasteners to maintain an article of clothing in a folded condition.

7. The method recited in claim 5, wherein said second operating mode dispenses plastic fasteners to attach labels, price tags, or combinations thereof to an article of clothing.

8. A method for transitioning a dual operating mode hand tool for dispensing plastic fasteners between a second operating mode and a first operating mode comprising the steps of:

providing a dual operating mode hand tool for dispensing plastic fasteners having a gun shaped casing with a barrel portion having a front end and a rear end, a handle portion, and a channel portion, said casing having a needle assembly opening at the front end of the barrel portion, a hollow needle, a needle assembly, a trigger, a locking switch, and an anvil, said anvil having a front portion and a rear portion;

rotating said front portion of said anvil from a second operating mode position near said channel portion to a first operating mode position near the front end of said barrel portion;

moving a safety switch to an unlocked position; and allowing said needle assembly to retract from a second operating mode position at the front end of said barrel portion to a first operating mode position at the rear end of said barrel portion.

9. The method of claim 8, wherein the trigger is pivotally mounted within said casing and extending out from a trigger slot.

10. The method of claim 8, wherein the front portion and the rear portion both have a free end and a fixed end wherein the fixed end of the rear portion is attached to the front of the barrel portion.

* * * * *